United States Patent
Lim et al.

(10) Patent No.: US 10,623,778 B2
(45) Date of Patent: Apr. 14, 2020

(54) FILTERING METHOD AND APPARATUS IN PICTURE CODING SYSTEM

(71) Applicant: LG ELECTRONICS INC., Seoul (KR)

(72) Inventors: Jaehyun Lim, Seoul (KR); Naeri Park, Seoul (KR); Jungdong Seo, Seoul (KR); Junghak Nam, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/764,723

(22) PCT Filed: Sep. 9, 2016

(86) PCT No.: PCT/KR2016/010146
§ 371 (c)(1),
(2) Date: Mar. 29, 2018

(87) PCT Pub. No.: WO2017/057857
PCT Pub. Date: Apr. 6, 2017

(65) Prior Publication Data
US 2018/0288443 A1 Oct. 4, 2018

Related U.S. Application Data

(60) Provisional application No. 62/234,646, filed on Sep. 29, 2015.

(51) Int. Cl.
*H04N 19/82* (2014.01)
*H04N 19/176* (2014.01)
(Continued)

(52) U.S. Cl.
CPC ............ *H04N 19/82* (2014.11); *H04N 19/117* (2014.11); *H04N 19/176* (2014.11); *H04N 19/463* (2014.11); *H04N 19/50* (2014.11)

(58) Field of Classification Search
CPC .... H04N 19/176; H04N 19/61; H04N 19/593; H04N 19/117; H04N 19/46; H04N 19/82;
(Continued)

(56) References Cited

U.S. PATENT DOCUMENTS

2011/0228843 A1* 9/2011 Narroschke ............ H04N 19/46
375/240.03
2015/0365703 A1* 12/2015 Puri ...................... H04N 19/176
375/240.24

FOREIGN PATENT DOCUMENTS

KR 10-2013-0001626 1/2013
KR 10-2013-0051029 5/2013
(Continued)

*Primary Examiner* — Farhan Mahmud
(74) *Attorney, Agent, or Firm* — Fish & Richardson P.C.

(57) ABSTRACT

An inter-prediction method performed by a decoding apparatus according to the present invention comprises the steps of: obtaining prediction related information from a bitstream; generating prediction samples by performing inter-prediction on a current block on the basis of the prediction related information; determining whether or not a Wiener filter is available for the current block; if the Wiener filter is available, generating a Wiener filter candidate list on the basis of neighboring blocks of the current block and deriving Wiener filter coefficients for the current block on the basis of a candidate block within the Wiener filter candidate list; and filtering the prediction samples on the basis of the derived Wiener filter coefficients. According to the present invention, an inter-prediction efficiency can be improved and coding efficiency can be improved.

20 Claims, 10 Drawing Sheets

(51) Int. Cl.
*H04N 19/117* (2014.01)
*H04N 19/463* (2014.01)
*H04N 19/50* (2014.01)

(58) Field of Classification Search
CPC ........ H04N 19/11; H04N 19/44; H04N 19/86; H04N 19/13
See application file for complete search history.

(56) References Cited

FOREIGN PATENT DOCUMENTS

| | | |
|---|---|---|
| KR | 10-2013-0095279 | 8/2013 |
| KR | 10-2014-0111039 | 9/2014 |
| KR | 10-2015-0004292 | 1/2015 |

* cited by examiner

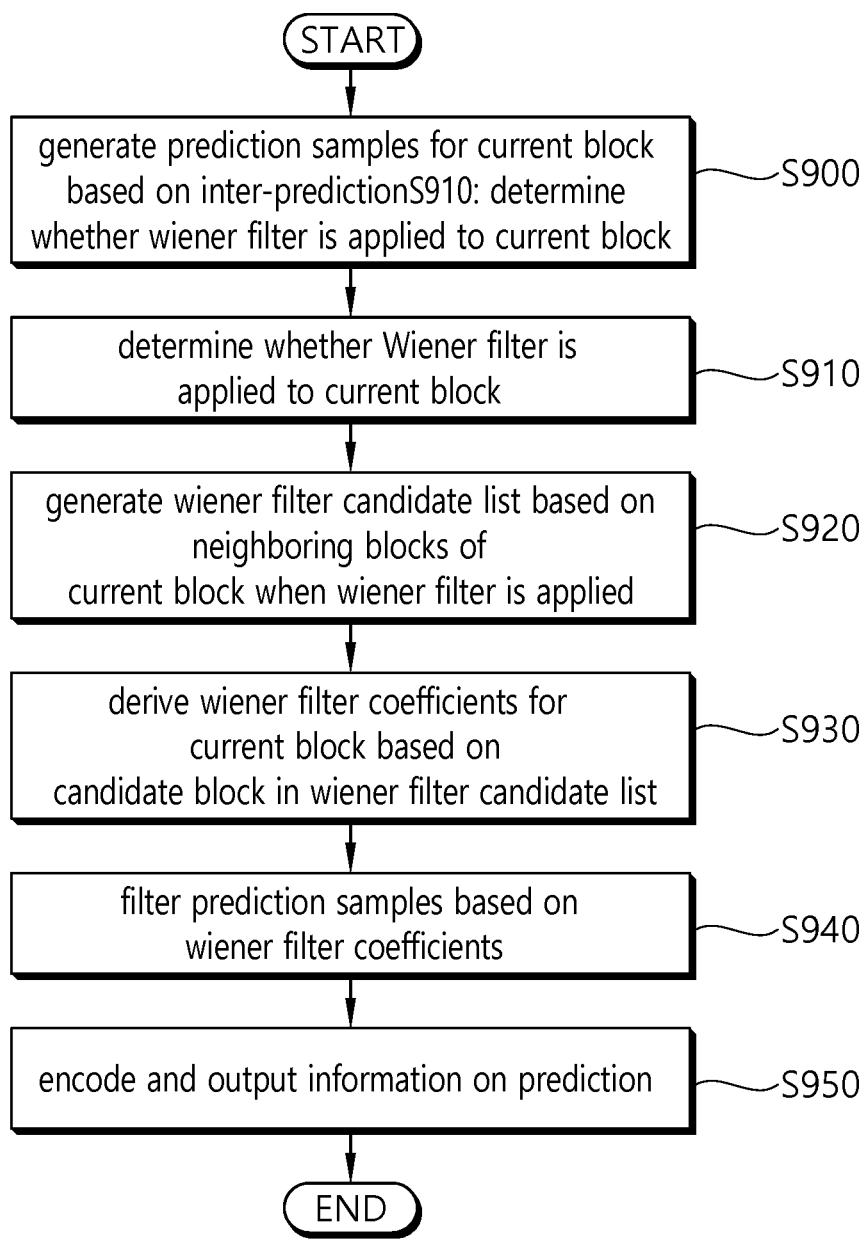

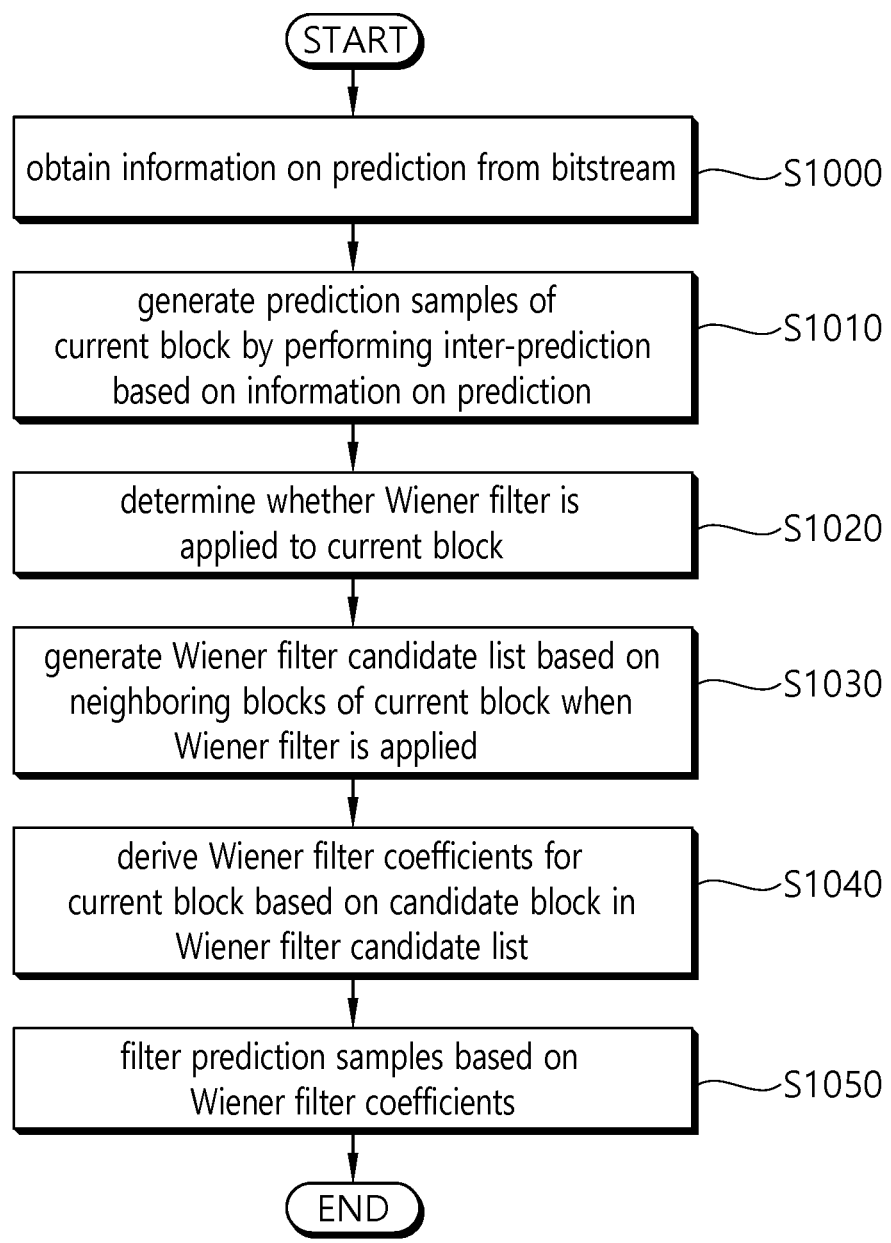

FILTERING METHOD AND APPARATUS IN PICTURE CODING SYSTEM

CROSS-REFERENCE TO RELATED APPLICATIONS

This application is the National Stage filing under 35 U.S.C. 371 of International Application No. PCT/KR2016/010146, filed on Sep. 9, 2016, which claims the benefit of U.S. Provisional Application No. 62/234,646 filed on Sep. 29, 2015, the contents of which are all hereby incorporated by reference herein in their entirety.

FIELD OF THE INVENTION

The present invention relates to a video coding technique, and more particularly, to a filtering method and apparatus for improving prediction performance in a video coding system.

RELATED ART

Demand for high-resolution, high-quality images such as HD (High Definition) images and UHD (Ultra High Definition) images has been increasing in various fields. As the image data has high resolution and high quality, the amount of information or bits to be transmitted increases relative to the legacy image data. Accordingly, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY OF THE INVENTION

The present invention provides a method and apparatus for enhancing video coding efficiency.

The present invention also provides a method and apparatus for improving the performance of prediction.

The present invention also provides a method and apparatus for improving the performance of inter prediction.

The present invention also provides a method and apparatus for improving predictive performance by applying a Wiener filter to prediction samples.

The present invention also provides a method and apparatus for efficiently applying filtering to prediction samples while reducing additional information on a Wiener filter.

In an aspect, an image decoding method performed by a decoding device includes: obtaining prediction-related information from a bitstream; generating prediction samples by performing inter-prediction on a current block based on the prediction-related information; determining whether a Wiener filter is enabled for the current block; generating a Wiener filter candidate list based on neighboring blocks of the current block and deriving Wiener filter coefficients for the current block based on a candidate block in the Wiener filter candidate list when the Wiener filter is enabled; and filtering the prediction samples based on the derived Wiener filter coefficients.

In another aspect, an image decoding device performing image decoding is provided. The decoding device includes an entropy decoder obtaining prediction-related information from a bitstream, and a predictor generating prediction samples by performing inter-prediction on a current block based on the prediction-related information, determining whether a Wiener filter is enabled for the current block, generating a Wiener filter candidate list based on neighboring blocks of the current block and deriving Wiener filter coefficients for the current block based on a candidate block in the Wiener filter candidate list when the Wiener filter is enabled, and filtering the prediction samples based on the derived Wiener filter coefficients.

In another aspect, an image encoding method performed by an encoding device includes: generating prediction samples for a current block based on inter prediction; determining whether a Wiener filter is enabled for the current block; generating a Wiener filter candidate list based on spatial neighboring blocks of the current block when the Wiener filter is enabled and deriving Wiener filter coefficients for the current block based on a candidate block in the Wiener filter candidate list; filtering the prediction samples based on the derived Wiener filter coefficients; and encoding and outputting prediction-related information for the current block.

In another aspect, an encoding device performing image encoding is provided. The encoding device includes a predictor generating prediction samples for a current block based on inter prediction, determining whether a Wiener filter is enabled for the current block, generating a Wiener filter candidate list based on spatial neighboring blocks of the current block when the Wiener filter is enabled and deriving Wiener filter coefficients for the current block based on a candidate block in the Wiener filter candidate list, and filtering the prediction samples based on the derived Wiener filter coefficients, and an entropy encoder encoding and outputting prediction-related information for the current block.

According to an embodiment of the present invention, it is possible to efficiently derive Wiener filter coefficients for a current block while using little additional information. In addition, according to an embodiment of the present invention, the prediction efficiency can be improved through filtering for prediction samples based on the Wiener filter coefficients, and the amount of data for residual signal transmission can be reduced, thereby improving the overall coding efficiency.

BRIEF DESCRIPTION OF THE DRAWINGS

FIG. 9 is a schematic view illustrating an example of a video encoding method according to an embodiment of the present invention.

FIG. 10 is a schematic view illustrating an example of a video decoding method according to an embodiment of the present invention.

DESCRIPTION OF EXEMPLARY EMBODIMENTS

Figure 1:
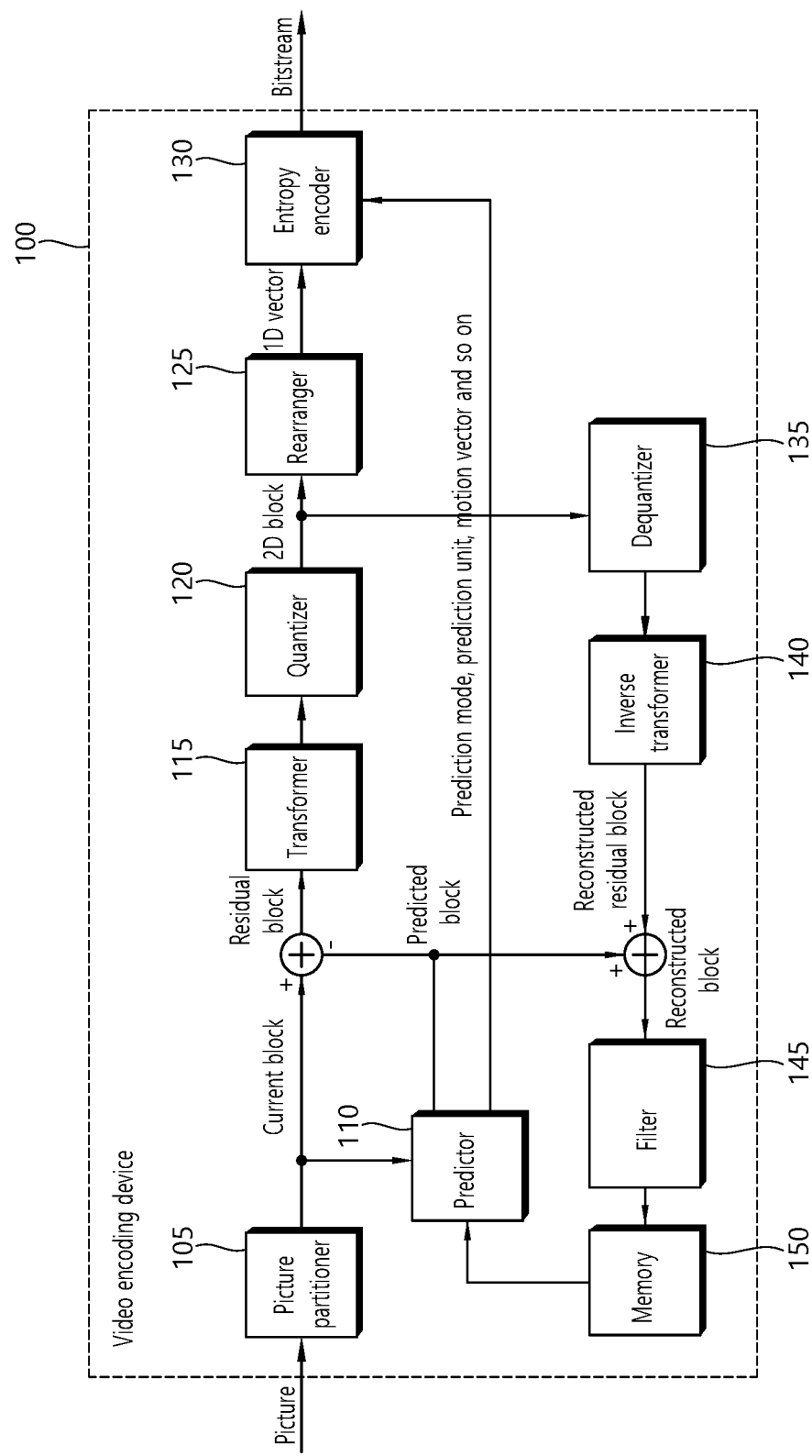
FIG. 1 is a view illustrating a video encoding device according to an embodiment of the invention.

The present invention can be modified in various forms, and specific embodiments thereof will be described and shown in the drawinGS. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions in an image encoding/decoding device and does not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, exemplary embodiments of the invention will be described in detail with reference to the accompanying drawings.

FIG. 1 is a block diagram schematically illustrating a video encoding device according to an embodiment of the invention.

Referring to FIG. 1, a video encoding device 100 includes a picture partitioner 105, a predictor 110, a transformer 115, a quantizer 120, a rearranger 125, an entropy encoder 130, a dequantizer 135, an inverse transformer 140, a filter 145, and memory 150.

The picture partitioner 105 may be configured to split the input picture into at least one processing unit block. In this connection, a block as a processing unit may be a prediction unit PU, a transform unit TU, or a coding unit CU. The picture may be composed of a plurality of coding tree unit CTUs. Each CTU may be split into CUs as a quad tree structure. The CU may be split into CUs having a deeper depth as a quad-tree structures. The PU and TU may be obtained from the CU. For example, the PU may be partitioned from a CU into a symmetric or asymmetric square structure. Also, the TU may be split into a quad tree structure from the CU.

The predictor 110 includes an inter prediction unit that performs an inter prediction process and an intra prediction unit that performs an intra prediction process, as will be described later. The predictor 110 performs a prediction process on the processing units of a picture divided by the picture dividing module 105 to create a prediction block including a prediction samples or a prediction samples array. In the predictor 110, the processing unit of a picture may be a CU, a TU, or a PU. The predictor 110 may determine whether the prediction performed on the corresponding processing unit is an inter prediction or an intra prediction, and may determine specific details for example, a prediction mode of the prediction methods. The processing unit subjected to the prediction process may be different from the processing unit of which the prediction method and the specific details are determined. For example, the prediction method and the prediction mode may be determined in the units of PU and the prediction process may be performed in the units of TU.

In the inter prediction, a prediction process may be performed on the basis of information on at least one of a previous picture and/or a subsequent picture of a current picture to create a prediction block. In the intra prediction, a prediction process may be performed on the basis of pixel information of a current picture to create a prediction block.

As an inter prediction method, a skip mode, a merge mode, and Advanced Motion Vector Prediction (AMVP) may be used. In inter prediction, a reference picture may be selected for the PU and a reference block corresponding to the PU may be selected. The reference block may be selected on an integer pixel (or sample) or fractional pixel (or sample) basis. Then, a prediction block is generated in which the residual signal with respect to the PU is minimized and the motion vector magnitude is also minimized. Pixels and pels are used interchangeably each other herein.

A prediction block may be generated as an integer pixel unit, or as a fractional pixel unit such as a ½ pixel unit or a ¼ pixel unit. In this connection, a motion vector may also be expressed as a fractional pixel unit.

Information such as the index of the reference picture selected via the inter prediction, the motion vector difference MVD, the motion vector predictor MVP, residual signal, etc., may be entropy encoded and then transmitted to the decoding device. When the skip mode is applied, the prediction block may be used as a reconstruction block, so that the residual may not be generated, transformed, quantized, or transmitted.

When the intra prediction is performed, the prediction mode may be determined in the unit of PU and the prediction process may be performed in the unit of PU. Alternatively, the prediction mode may be determined in the unit of PU and the inter prediction may be performed in the unit of TU.

The prediction modes in the intra prediction may include 33 directional prediction modes and at least two non-directional modes, as an example. The non-directional modes may include a DC prediction mode and a planar mode.

In the intra prediction, a prediction block may be constructed after a filter is applied to a reference sample. At this time, it may be determined whether a filter should be applied to a reference sample according to the intra prediction mode and/or the size of a current block.

Residual values (a residual block or a residual signal) between the constructed prediction block and the original block are input to the transformer 115. The prediction mode information, the motion vector information, and the like used for the prediction are encoded along with the residual values by the entropy encoder 130 and are transmitted to the decoding device.

The transformer 115 performs a transform process on the residual block in the unit of TUs and generates transform coefficients.

A transform block is a rectangular block of samples and is a block to which the same transform is applied. The transform block may be a TU and may have a quad-tree structure.

The transformer 115 may perform a transform process according to the prediction mode applied to a residual block and the size of the block.

For example, when intra prediction is applied to a residual block and the residual block has an 4×4 array, the residual block is transformed using discrete sine transform DST. Otherwise, the residual block may be transformed using discrete cosine transform DCT.

The transformer 115 may construct a transform block of transform coefficients through the transform.

The quantizer 120 may quantize the residual values, that is, transform coefficients, transformed by the transformer 115 and may create quantization coefficients. The values calculated by the quantizer 120 may be supplied to the dequantizer 135 and the rearranger 125.

The rearranger 125 may rearrange the transform coefficients supplied from the quantizer 120. By rearranging the quantization coefficients, it is possible to enhance the encoding efficiency in the entropy encoder 130.

The rearranger 125 may rearrange the quantized transform coefficients in the form of a two-dimensional block to the form of a one-dimensional vector through the use of a coefficient scanning method.

The entropy encoder 130 may be configured to entropy code the symbol according to a probability distribution based on the quantized transform values rearranged by the rearranger 125 or the encoding parameter value calculated during the encoding process, etc. and then to output a bitstream. The entropy encoding method is a method of receiving a symbol having various values and expressing the symbol as a binary string that can be decoded while removing statistical redundancy thereof.

In this connection, the symbol means the to-be encoded/decoded syntax element, coding parameter, residual signal value and so on. The encoding parameter is required for encoding and decodinG. The encoding parameter may contain information that can be inferred during encoding or decoding, as well as information encoded in an encoding device and passed to a decoding device like the syntax element. The encoding parameter is the information needed to encode or decode the image. The encoding parameter may include statistics or values such as for example, the intra/inter prediction mode, movement/motion vector, reference picture index, coding block pattern, residual signal presence or absence, transform coefficient, quantized transform coefficient, quantization parameter, block size, block partitioning information, etc. Also, the residual signal may mean a difference between an original signal and a prediction signal. Also, the difference between the original signal and the prediction signal may be transformed to define the residual signal, or the difference between the original signal and the prediction signal may be transformed and quantized to define the residual signal. The residual signal can be called the residual block in the block unit, and can be called the residual samples in the sample unit.

When the entropy encoding is applied, the symbols may be expressed so that a small number of bits are allocated to a symbol having a high probability of occurrence, and a large number of bits are allocated to a symbol having a low probability of occurrence. This may reduce the size of the bit string for the to-be-encoded symbols. Accordingly, the compression performance of image encoding may be increased via the entropy encoding.

Encoding schemes such as exponential Golomb, Context-Adaptive Variable Length Coding (CAVLC), and Context-Adaptive Binary Arithmetic Coding (CABAC) may be used for the entropy encodinG. For example, the entropy encoder 130 may store therein a table for performing entropy encoding, such as a variable length coding/code (VLC) table. The entropy encoder 130 may perform entropy encoding using the stored VLC table. Also, the entropy encoder 130 derives a binarization method of a corresponding symbol and a probability model of a corresponding symbol/bin, and then performs entropy encoding using the derived binarization method or probability model.

The entropy encoder 130 may give a predetermined change to a parameter set or syntaxes to be transmitted, when necessary.

The dequantizer 135 dequantizes the values transform coefficients quantized by the quantizer 120. The inverse transformer 140 inversely transforms the values dequantized by the dequantizer 135.

The residual value or residual samples or residual samples array generated by the dequantizer 135 and the inverse-transformer 140, and the prediction block predicted by the predictor 110 may be combined to form a reconstructed block including a reconstructed sample or a reconstructed sample array.

In FIG. 1, a residual block and a prediction block are added to create a reconstructed block by an adder. At this time, the adder may be considered as a particular unit reconstructed block creating unit that generates a reconstructed block.

The filter 145 applies a deblocking filter, an ALF Adaptive Loop Filter, an SAO Sample Adaptive Offset to the reconstructed picture.

The deblocking filter removes a block distortion generated at the boundary between blocks in the reconstructed picture. The ALF performs a filtering process on the basis of the result values of the comparison of the original picture with the reconstructed picture of which the blocks are filtered by the deblocking filter. The ALF may be applied only when high efficiency is necessary. The SAO reconstructs offset differences between the residual blocks having the deblocking filter applied thereto and the original picture and is applied in the form of a band offset, an edge offset, or the like.

On the other hand, the filter 145 may not perform a filtering operation on the reconstructed block used in the inter prediction.

The memory 150 may store the reconstructed block or picture calculated by the filter 145. The reconstructed block or picture stored in the memory 150 may be supplied to the predictor 110 that performs the inter prediction.

Figure 2:
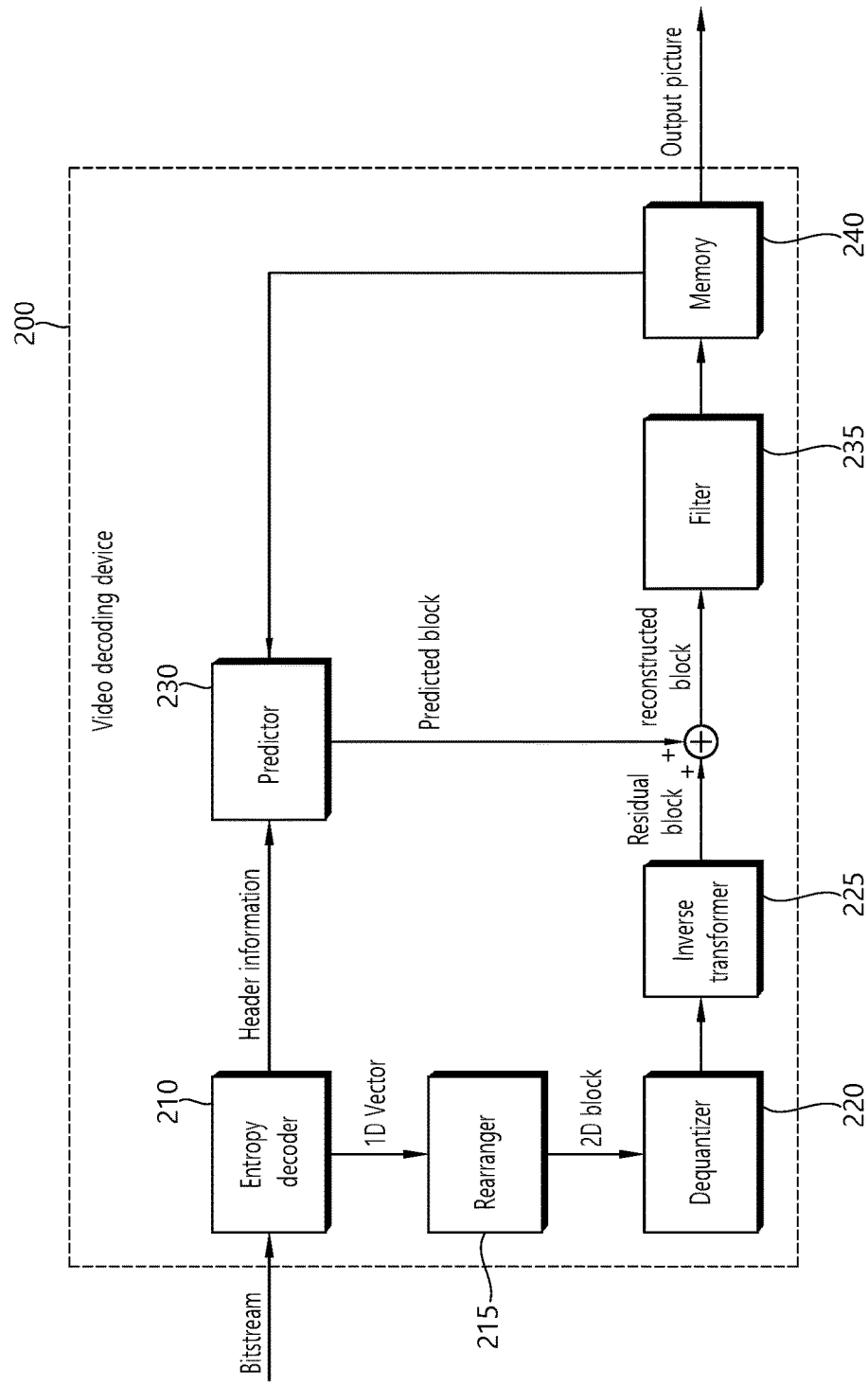
FIG. 2 is a view illustrating a video decoding device according to an embodiment of the invention.

FIG. 2 is a block diagram schematically illustrating a video decoding device according to an embodiment of the invention. Referring to FIG. 2, a video decoding device 200 may include an entropy decoder 210, a rearranger 215, a dequantizer 220, an inverse transformer 225, a predictor 230, a filter 235, and memory 240.

When a video bitstream is input from the video encoding device, the input bitstream may be decoded on the basis of the order in which video information is processed by the video encoding device.

The entropy decoder 210 may entropy-decode the input bitstream according to a probability distribution to generate symbols in a quantized coefficient form. The entropy decoding method is a method of receiving a sequence of binary numbers and generating each of the symbols using the sequence. The entropy decoding method is similar to the entropy encoding method described above.

For example, when a Variable Length Coding VLC (hereinafter referred to as 'VLC') such as CAVLC is used to perform entropy encoding in a video encoding device, the entropy decoder 210 may perform decoding using the same VLC table as the encoding device used in the encoding device. Also, when CABAC is used to perform entropy encoding in a video encoding device, the entropy decoder 210 may perform the entropy decoding using CABAC.

More specifically, the CABAC entropy decoding method may include receiving a bin corresponding to each syntax element in a bitstream, determining a context model using to-be-decoded syntax element information, decoding information of a neighboring block and a to-be-decoded block, or information of a symbol/bin decoded in a previous step, and predicting a probability of occurrence of a bin according to the determined context model and thus performing arithmetic decoding of the bin to generate a symbol corresponding to a value of each syntax element. In this connection, after determining the context model, the CABAC entropy decoding method may further include a step of updating the context model using the information of the decoded symbol/bin to determine a context model of the next symbol/bin.

Information for constructing a predicted block out of the information decoded by the entropy decoder 210 may be supplied to the predictor 230, and the residual values, that is, the quantized transform coefficients, entropy-decoded by the entropy decoder 210 may be input to the rearranger 215.

The rearranger 215 may rearrange the bitstream information, that is, the quantized transform coefficients, entropy-decoded by the entropy decoder 210 on the basis of the rearrangement method in the video encoding device.

The rearranger 215 may reconstruct and rearrange the coefficients expressed in the form of a one-dimensional vector into coefficients in the form of a two-dimensional block. The rearranger 215 may scan the coefficients on the basis of the prediction mode applied to the current block transform block and the size of the transform block and may create an array of coefficients quantized transform coefficients in the form of a two-dimensional block.

The dequantizer 220 may perform dequantization on the basis of the quantization parameters supplied from the video encoding device and the coefficient values of the rearranged block.

The inverse transformer 225 may perform the inverse DCT and/or inverse DST of the DCT and/or DST, which has been performed by the transformer of the video encoding device, on the quantization result from the video encoding device.

The inverse transform may be performed on the basis of a transfer unit or a partition unit of a picture determined by the video encoding device. The transformer of the video encoding device may selectively perform the DCT and/or DST according to plural information pieces such as the prediction method, the size of a current block, and the prediction direction, and the inverse transformer 225 of the video decoding device may perform the inverse transform on the basis of the transform information on the transform performed by the transformer of the video encoding device.

The predictor 230 generates a prediction block including prediction samples or prediction samples array based on the prediction block generation-related information provided by the entropy decoder 210 and the previously decoded block and/or picture information provided from the memory 240.

When the prediction mode for the current PU is the intra prediction mode, the predictor 230 may perform the intra prediction to generate a prediction block based on pixel information in the current picture.

When the prediction mode for the current PU is the inter prediction mode, the predictor 230 may be configured to perform inter prediction on a current PU based on information included in at least one picture of a previous picture or a subsequent picture to the current picture. In this connection, information about the motion information necessary for inter prediction of the current PU provided in the video encoding device, such as motion vector and reference picture index may be deduced via checking the skip flag and merge flag received from the encoding device.

The predictor 230 may generate a prediction block such that the residual signal relative to the current block is minimized and the motion vector size is minimized when inter prediction is performed on the current picture.

On the other hand, the motion information derivation method may be changed according to the prediction mode of the current block. The prediction mode applied to inter prediction may include an Advanced Motion Vector Prediction (AMVP) mode, a merge mode, and the like.

For example, when a merge mode is applied, the encoding device and the decoding device may generate a merge candidate list using the motion vector of the reconstructed spatial neighboring block and/or the motion vector corresponding to the Col block which is a temporally neighboring block. In the merge mode, the motion vector of the candidate block selected in the merge candidate list is used as the motion vector of the current block. The encoding device may transmit a merge index indicating a candidate block having an optimal motion vector selected from the candidate blocks included in the merge candidate list to the decoding device. In this case, the decoding device may derive the motion vector of the current block using the merge index.

In another example, when the AMVP (Advanced Motion Vector Prediction) mode is applied, the encoding device and decoding device generate a motion vector predictor candidate list using a motion vector of a reconstructed spatial neighboring block and/or a motion vector corresponding to a Col block as a temporal neighboring block. That is, the motion vector of the reconstructed spatial neighboring block and/or the motion vector corresponding to the Col block as a temporal neighboring block may be used as a motion vector candidate. The encoding device may transmit to the decoding device a prediction motion vector index indicating the optimal motion vector selected from among the motion vector candidates included in the motion vector predictor candidate list. In this connection, the decoding device may select the prediction motion vector for the current block from the motion vector candidates included in the motion vector candidate list using the motion vector index.

The encoding device may obtain the motion vector difference MVD between the motion vector for the current block and the motion vector predictor (MVP), encode the MVD, and transmit the encoded MVD to the decoding device. That is, the MVD may be a value obtained by subtracting the motion vector predictor (MVP) from the motion vector (MV) for the current block. In this connection, the decoding device may decode the received motion vector difference, and derive the motion vector for the current block via addition between the decoded motion vector difference and the motion vector predictor.

Also, the encoding device may transmit a reference picture index indicating a reference picture to the decoding device.

The decoding device may predict the motion vector of the current block using the motion information of the neighboring block and derive the motion vector of the current block using the residual received from the encoding device. The decoding device may generate predicted block for the current block based on the derived motion vector and the reference picture index information received from the encoding device.

In another example, when the merge mode is applied, the encoder and decoder may generate a merge candidate list using the motion information of the reconstructed neighboring blocks and/or the motion information of the Col block. That is, when there is motion information of reconstructed neighboring blocks and/or Col blocks, the encoder and decoder may use the motion information as a merge candidate for the current block.

The encoder may select a merge candidate that may provide optimal encoding efficiency among the merge candidates included in the merge candidate list as motion information for the current block. In this connection, a merge index indicating the selected merge candidate may be included in the bitstream and transmitted to the decoder. The decoder may select one of the merge candidates included in the merge candidate list using the transmitted merge index. The decoder may determine the selected merge candidate as motion information of the current block. Accordingly, when the merge mode is applied, motion information corresponding to reconstructed neighboring blocks and/or Col blocks may be used as motion information of the current block. The decoder may reconstruct the current block by adding the predicted block and the residual transmitted from the encoder.

In the above-described AMVP and merge modes, motion information of the reconstructed neighboring block and/or motion information of the Col block may be used to derive motion information of the current block.

In the skip mode, which is one of the other modes used for inter-picture prediction, neighboring block information may be used for the current block as it is. Accordingly, in the case of skip mode, the encoder does not transmit syntax information such as the residual to the decoding device in addition to information indicating which block's motion information to use as the motion information for the current block.

The encoder and decoder may generate a predicted block of the current block by performing motion compensation on the current block based on the derived motion information. In this connection, the predicted block may be a motion compensated block generated by performing motion compensation on the current block. Also, a plurality of motion compensated blocks may constitute one motion compensated image.

The reconstructed block may be generated using the predicted block generated by the predictor 230 and the residual block provided by the inverse-transformer 225. FIG. 2 illustrates that using the adder, the predicted block and the residual block are combined to generate the reconstructed block. In this connection, the adder may be viewed as a separate element (a reconstructed block generator) that is configured to generate the reconstructed block. In this connection, the reconstructed block includes reconstructed samples or a reconstructed samples array as described above; the predicted block includes a prediction samples or a prediction samples array; the residual block may include a residual samples or a residual samples array. Accordingly, the reconstructed samples or the reconstructed samples array can be considered to be generated by combining the corresponding prediction samples or prediction samples array with the corresponding residual samples or residual samples array.

When the skip mode is used for a block, the residual signal may not be transmitted and the predicted block may be used as a reconstructed block.

The reconstructed block and/or picture may be supplied to the filter 235. The filter 235 may perform a deblocking filtering operation, an SAO operation, and/or an ALF operation on the reconstructed block and/or picture.

The memory 240 may store the reconstructed picture or block for use as a reference picture or a reference block and may supply the reconstructed picture to an output unit.

The elements that is directly related to decoding images among the entropy decoder 210, the rearranger 215, the dequantizer 220, the inverse transformer 225, the predictor 230, the filter 235 and the memory 240 which are included in the decoding device 200, for example, the entropy decoder 210, the rearranger 215, the dequantizer 220, the inverse transformer 225, the predictor 230, the filter 235, and so on may be expressed as a decoder or a decoding module that is distinguished from other elements.

In addition, the decoding device 200 may further include a parsor not shown in the drawing that parses information related to the encoded images included in a bitstream. The parsor may include the entropy decoder 210, and may be included in the entropy decoder 210. Such a parsor may also be implemented as an element of the decoding module.

Figure 3:
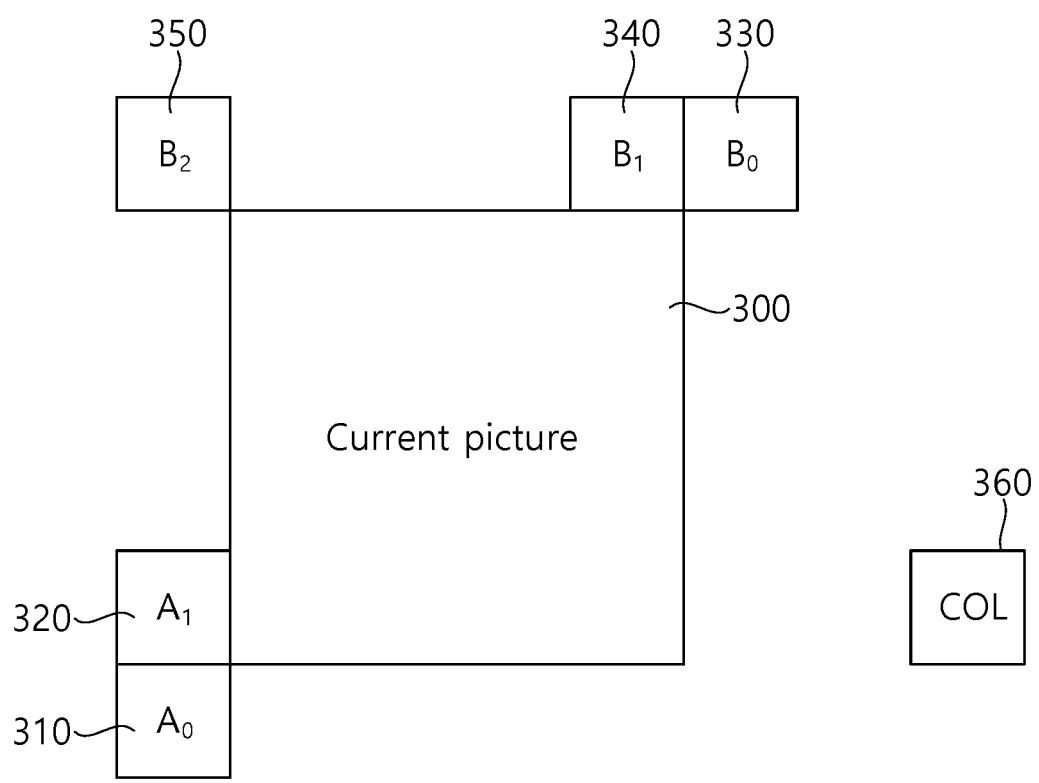
FIG. 3 is a view illustrating an example of a candidate block that may be used when inter prediction is performed on a current block.

FIG. 3 schematically illustrates an example of a candidate block that may be used when inter prediction is performed on a current block. In this connection, the current block may be a predicted block.

The prediction module of the encoder and decoder may use as candidate blocks, reconstructed neighboring blocks at predetermined positions around the current block 300. For example, in the example of FIG. 3, two blocks A0 310 and A1 320 located on the left side of the current block and three blocks B0 330, B1 340, and B2 350 above the current block may be selected as spatial candidate blocks. In this connection, the block A0 310 may be referred to as a lower left neighboring block, the block A1 320 may be referred to as a left neighboring block. The block B0 330 may be referred to as the upper right neighboring block. The block B1 340 is referred to as an upper neighboring block. The block B2 350 may be referred to as an upper left neighboring block.

Also, the above-mentioned Col block 360 may be used as a candidate block as a temporal candidate block in addition to the spatially adjacent blocks. Col block 360 may be referred to as a ColPb Col predicted block. The Col block is a block corresponding to the current block in a collocated picture (Col picture) which is one of the reconstructed reference pictures. The Col block may be a block existing in a predetermined relative position (ex. a position arithmetically shifted according to certain criteria from the center lower-right sample position or the lower-right neighboring sample of the block existing at the same position as the current block in the Col picture).

Specifically, in the merge mode, the MV of the optimal merge candidate among the merge candidate list generated based on the candidate blocks is used as the MV for the current block. The encoding device encodes merge index information indicating the selected merge candidate in the merge candidate list, and transmits the merge index information to the decoding device through a bitstream.

The decoding device may derive the MV of the merge candidate block selected from the merge candidate list as the MV for the current block based on the merge index information transmitted from the encoding device. The encoding device may derive a reference block on the reference picture based on the MV of the current block, and may use the reference block as a prediction block for the current block. That is, samples in the reference block may be used as prediction samples for the current block.

Specifically, in the AMVP mode, an optimal MVP for the current block is selected from an MVP candidate list including Motion Vector Predictor (MVP) candidates derived from the candidate blocks. In this case, the encoding device performs motion estimation to derive an optimal MVP from the MVP candidate list based on the derived MV of the current block, and calculates an MVD obtained by subtracting the MVP from the MV. The encoding device encodes MVP index information indicating which MVP candidate among the MVP candidates included in the MVP candidate list is the MVP for the current block and MVD information indicating the x axis value and the y axis value of the obtained MVD, and transmits the encoded information to the decoding device through bitstream.

The decoding device may derive the MVP for the current block from the MVP candidate list based on the MVP index information and MVD information transmitted from the encoding device, and may derive the MV of the current block by adding the MVD to the derived MVP. A reference block on the reference picture is derived based on the MV of the current block, and the reference block may be used as a prediction block for the current block. That is, the samples in the reference block may be used as prediction samples for the current block.

The decoding device may receive information on residual samples from the encoding device to generate the residual samples. The information on the residual samples may include information on the transform coefficients. Specifically, for example, the decoding device may receive the transform coefficients from the encoding device through the bitstream, and invert the transform coefficients to generate a residual block (or residual samples). Here, the residual sample may represent a difference between the original sample and the prediction sample, and the residual block may represent a difference between the original block including the original samples and the prediction block including the prediction samples.

Accordingly, as the prediction performance is improved, the amount of data for information on the residual samples can be reduced, thereby improving the overall coding efficiency.

However, since the current block is predicted using limited information in performing the prediction process, it is difficult to generate a prediction block almost identical to the original block by increasing the prediction performance. Thus, in the present disclosure, the prediction performance can be improved by applying filtering to a prediction block (prediction samples in the prediction block) based on reconstructed samples/block information located around the current block. In this case, the prediction performance can be improved by applying the Wiener filter-based filtering to the prediction samples of the prediction block. In order to apply the Wiener filter, filter coefficients need to be determined, and accordingly, information about the filter coefficients needs to be transmitted and received. In the present disclosure, the prediction accuracy of the prediction block can be improved by applying the Wiener filter generated using only a small amount of side information to the prediction block, and accordingly, the amount of data necessary for coding the residual block can be reduced, thereby improving the image compression efficiency. In this case, for the generating of the filter coefficient, it is possible to generate a more suitable filter by reflecting the prediction mode, the block partitioning information, and the block characteristic.

First, a process for deriving the filter coefficients is as follows.

Figure 4:
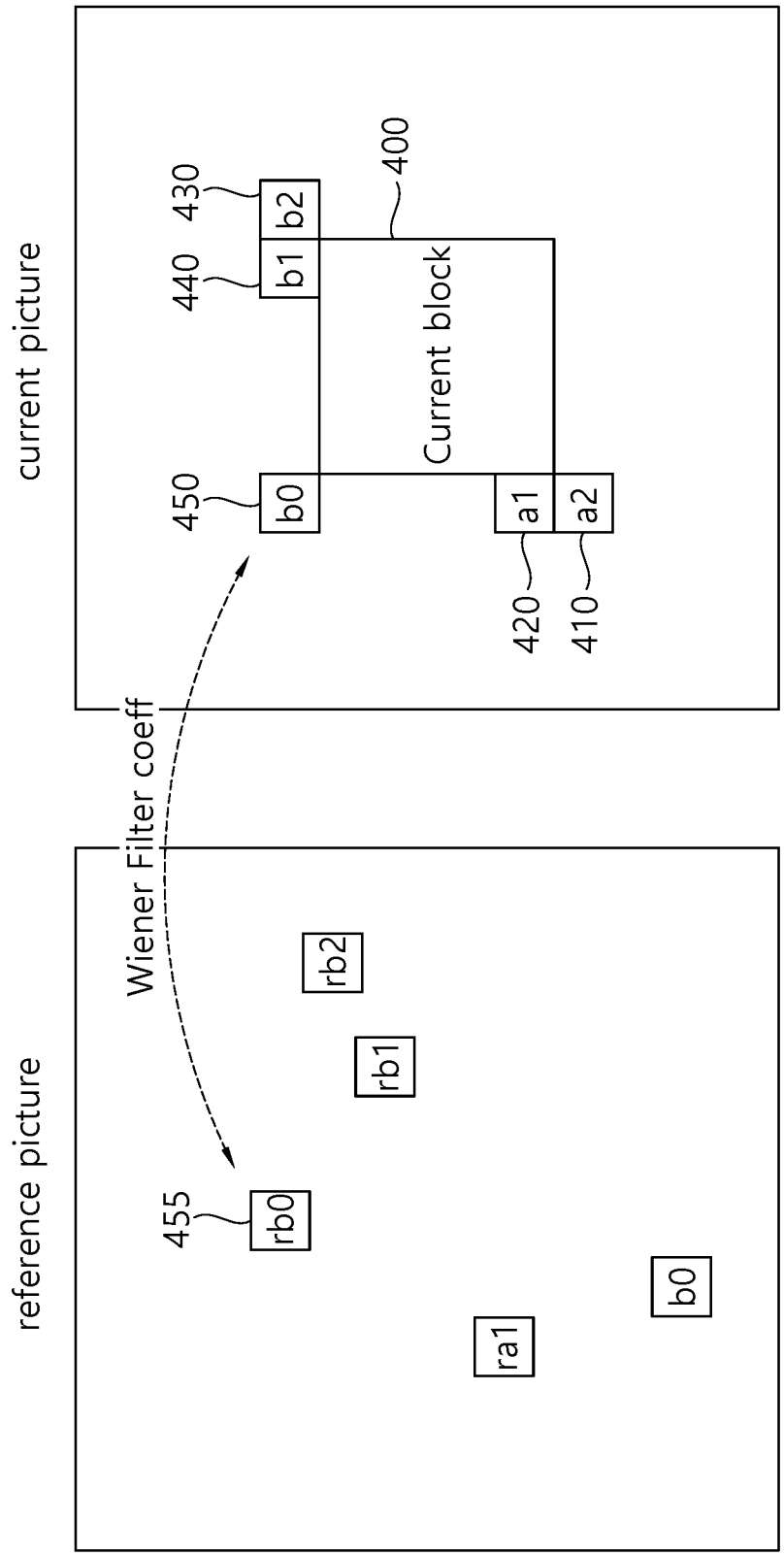
FIG. 4 a view illustrating a method of deriving filter coefficients based on neighboring blocks of a current block.

FIG. 4 exemplarily shows a method of deriving filter coefficients based on neighboring blocks of a current block. Here, the current block may be a coding block (CB) or a coding unit (CU). Also, the neighboring blocks may be reconstructed blocks.

Referring to FIG. 4, the filter coefficients of the Wiener filter for a current block may be derived based on neighboring blocks 410, 420, 430, 440, and 450 of a current block 400. For example, the filter coefficients for each of neighboring blocks 410, 420, 430, 440, and 450 may be derived using a lower left neighboring block 410, a left neighboring block 420, an upper right neighboring block 430, an upper neighboring block 440, and an upper left neighboring block 450 of the current block 400. Also, additional filter coefficients may be derived by overall considering the filter coefficients for each of the neighboring blocks.

The filter coefficients candidates 410, 420, 430, 440 and 450 and/or the additional filter coefficients may be used as filter coefficient candidates, and the filter coefficients selected therefrom may be used as filter coefficients for the current block 400.

In this case, for example, the encoding device and the decoding device may derive the filter coefficients for the corresponding neighboring block based on a relationship between the neighboring block and a reference block of the corresponding neighboring block. For example, the reference block for the upper left neighboring block 450 may be a reference block 455. That is, the reference block 455 may be a block indicated by the MV of the upper left neighboring block 450 on a reference picture of the upper left neighboring block 450. In this case, filter coefficients for the upper left neighboring block 450 may be derived based on a relationship between the upper left neighboring block 450 and the reference block 455. This is the same for the other neighboring blocks.

A method of obtaining the filter coefficients for the corresponding neighboring block based on the relationship between a neighboring block and the reference block of the corresponding neighboring block may be performed as follows.

Figure 5:
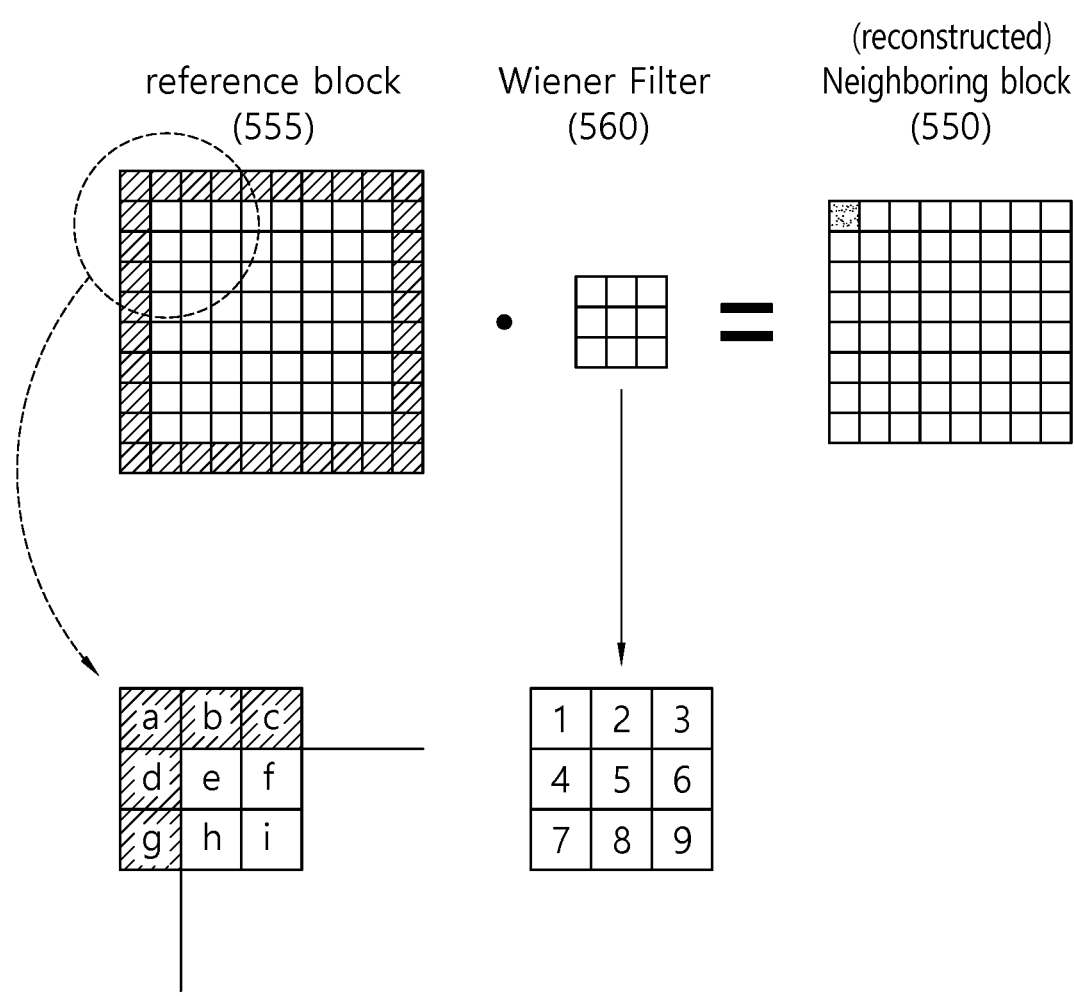
FIG. 5 a view illustrating an example of a method for obtaining Wiener filter coefficients for a neighboring block.

FIG. 5 shows an example of a method for obtaining Wiener filter coefficients for a neighboring block. It is assumed in FIG. 5 that the neighboring block and the reference block thereof have an 8×8 sample size and the Wiener filter has a 3×3 sample size.

Referring to FIG. 5, when the reference block 555 becomes equal or most similar to the neighboring block 550 by applying a Wiener filter 560 to the reference block 555, the filter coefficients of the corresponding Wiener filter 560 become the filter coefficients of the neighboring block 550.

The Wiener filter may be applied to the remaining samples sequentially from the top-left sample of the reference block 555 in a raster scan order. Since the size of the Wiener filter 560 is 3×3 in FIG. 5, in order to apply the Wiener filter 560 to boundary samples located within the boundary of the reference block 555, one row of samples and one column of samples are padded on the reference block 555, respectively. The size of the padding region may vary according to the size of the Wiener filter 560. For example, when the size of the Wiener filter 560 is 5×5, two rows of samples and two columns of samples may be padded on the reference block 555, respectively.

The filter coefficients of the Wiener filter 560 may be one-dimensionally arranged according to a predetermined order.

Here, the equation for obtaining the Wiener filter 560 may be as follows.

[Equation 1]

$$R^T R \cdot h = R^T O \qquad (1)$$

Here, R is a matrix formed of samples of a reference block, h is a Wiener filter coefficient matrix, and O is a sample of a neighboring block. In addition, RT denotes a transpose matrix of the matrix R.

Referring again to FIG. 5, when the order of the Wiener filter coefficients is set as 1 to 9 as shown in the drawing, the order of the corresponding samples in the reference block may be set as a to i. In this case, Equation (1) can be expressed as follows.

[Equation 2]

$$\begin{bmatrix} a \\ b \\ c \\ d \\ e \\ f \\ g \\ h \\ i \end{bmatrix} \cdot [a\ b\ c\ d\ e\ f\ g\ h\ i] \cdot \begin{bmatrix} 1 \\ 2 \\ 3 \\ 4 \\ 5 \\ 6 \\ 7 \\ 8 \\ 9 \end{bmatrix} = \begin{bmatrix} a \\ b \\ c \\ d \\ e \\ f \\ g \\ h \\ i \end{bmatrix} \cdot O \qquad (2)$$

In the above example, since the sizes of the reference block and the neighboring block are 8×8, a matrix relation like Equation (2) may be derived for each sample in the neighboring block, and a total of 64 relations may be derived for all samples in the neighboring block.

To simplify the mathematical expression, if a sum function may be applied to both sides of the mathematical expression, Equation (2) can be expressed as follows.

[Equation 3]

$$R^T R \cdot h = R^T O \qquad (3)$$

When the sum operation is completed in Equation (3), a matrix expression is derived in each of the left and right sides. Here, since h is to be obtained, h can be obtained by multiplying the inverse matrix of the term before h by the left and right sides, respectively, and the Wiener filter coefficients can be obtained.

Referring again to FIG. 4, optimal filter coefficients for the current block may be selected based on the filter coefficient candidates thus obtained. The encoding device may apply the filter coefficients candidates to the current block, and based thereon, may select filter coefficients that minimize errors with the original block. In this case, the encoding device may encode a flag indicating whether the Wiener filter is enabled or not and an index of the selected filter coefficients, and transmit the encoded flag and index to the decoding device. The flag may be referred to as a filter flag, a Wiener filter flag, or a WF flag. The index may be referred to as a filter index, a Wiener filter index, or a WF index.

The decoding device may decode the received flag and index, may determine whether or not the Wiener filter is enabled for the current block based on the flag, and may derive filter coefficients for applying the Wiener filter based on the index from the neighboring blocks or from the filter coefficients candidates. For example, the index may indicate one of the filter coefficients candidates that are separately configured, or may indicate one of the neighbor candidate blocks. For example, when the index indicates one of the neighboring candidate blocks, the order of the index numbers may be determined in a random order. For example, the index numbers may be based on the order of the lower left neighboring block 410, the left neighboring block 420, the upper right neighboring block 430, the upper neighboring block 440, and the upper left neighboring block 450, or may be based on the order of the left neighboring block 420, the upper neighboring block 440, the upper right neighboring block 430, the lower left neighboring block 410, and the upper left neighboring block 450.

As shown in FIG. 4, when the lower left neighboring block 410 is a2, the left neighboring block 420 is a1, the upper right neighboring block 430 is b2, the upper neighboring block 440 is b1, and the upper left neighboring block 450 is b0, the order of the index numbers may follow one of the methods shown in Table 1 below.

TABLE 1

| Index | 0 | 1 | 2 | 3 | 4 | 5 |
|---|---|---|---|---|---|---|
| method 1 | a1 | b1 | b2 | a2 | b0 | |
| method 2 | a1 | a2 | b0 | b1 | b2 | |
| method 3 | a1 | b1 | b2 | a2 | b0 | all |
| method 4 | a1 | a2 | b0 | b1 | b2 | all |
| method 5 | all | a1 | b1 | b2 | a2 | b0 |
| method 6 | all | a1 | a2 | b0 | b1 | b2 |

In Table 1, each method represents an example of a filter coefficient candidates list, and "all" means that additional filter coefficients derived by synthesizing the filter coefficients for each of the neighboring blocks are used.

On the other hand, the Wiener filter coefficients for each of the neighboring blocks 410, 420, 430, 440 and 450 may be determined, for example, as the following units.

a. Coding block including neighboring blocks
b. Prediction block including neighboring blocks
c. Minimum unit block having the same MV existing at a neighboring block position
d. Block of a predetermined size
e. Selective combination of a through d On the other hand, only enabled neighboring blocks among the neighboring blocks 410, 420, 430, 440 and 450 may be considered for deriving the filter coefficients. Here, the neighboring block may be determined to be disabled when at least one of the following criteria is satisfied.

a. When the neighboring block is located outside the current slice (or tile)
b. When the neighboring block is located outside the boundary of the current picture
c. When the neighboring block is an intra-coded block Accordingly, when the neighboring block described in FIG. 4 is disabled, the candidate list may be generated by excluding blocks that are disabled at the time of generating the filter coefficient candidate list. In this case, the disabled block may be excluded from the candidate list, and the index values of enabled blocks subordinate to the disabled block may be sequentially reduced.

Figure 6:
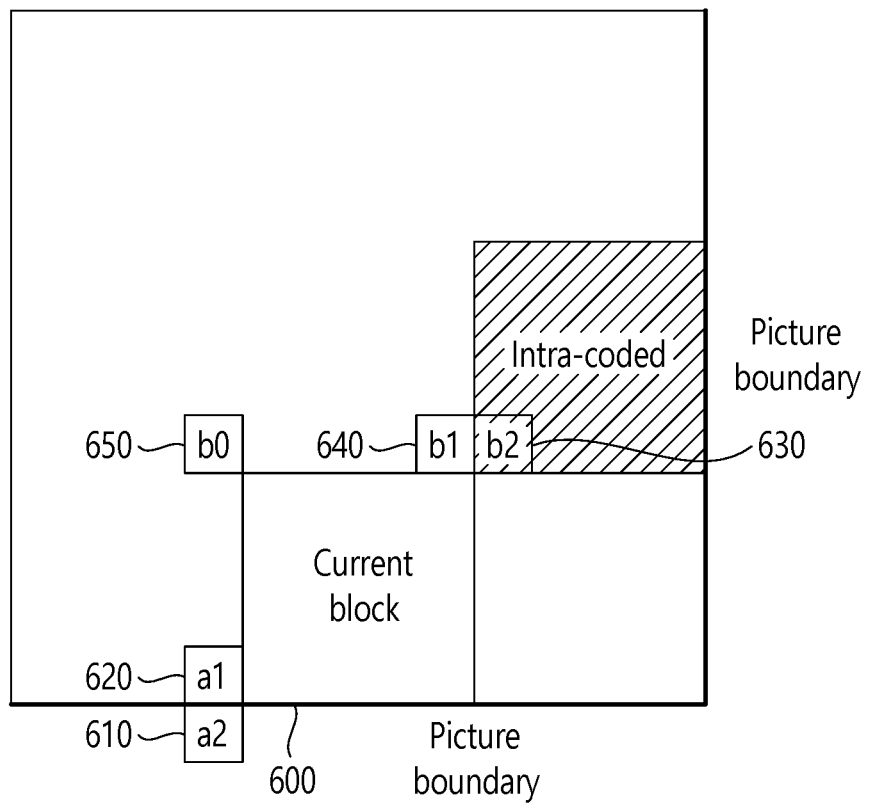
FIG. 6 is a view illustrating a case where a neighboring block is disabled.

FIG. 6 exemplarily shows a case where a neighboring block is disabled.

Referring to FIG. 6, among neighboring blocks 610, 620, 630, 640, and 650 of the current block 600, the lower left neighboring block 610 is located outside the boundary of the current picture, and the upper left neighboring block 630 corresponds to an intra-coded block. Accordingly, the lower left neighboring block 610 may be determined as a disabled block, and the upper right neighboring block 630 may be determined as a disabled block. In this case, the disabled block may be excluded when generating the filter coefficients candidate list described above.

As described above, the lower left neighboring block 610 may be a2, the left neighboring block 620 may be a1, the upper right neighboring block 630 may be b2, the upper neighboring block 640 may be b1, and the upper left neighboring block 650 may be b0. In this case, for example, assuming that the original order of the candidate list is a1, b1, b2, a2, and b0, when the disabled blocks are excluded, the modified candidate list may include candidates in an order of a1, b1, and b0. In this case, when a Truncated Unary (TU) code is used to express the indexes of each candidate of the candidate list in a binary code, for example, the binary code may be modified from Table 2 to Table 3 according to the number of enabled candidates.

TABLE 2

| Index | Candidate | Binary |
|-------|-----------|--------|
| 0 | a1 | 0 |
| 1 | b1 | 10 |
| 2 | b2 | 110 |
| 3 | a2 | 1110 |
| 4 | b0 | 1111 |

TABLE 3

| Index | Candidate | Binary |
|-------|-----------|--------|
| 0 | a1 | 0 |
| 1 | b1 | 10 |
| 2 | b0 | 11 |

Table 2 shows binary codes when five candidates are included, and Table 3 shows binary codes when three candidates are included. In Table 3, a case where a1, b1, and b0 are enabled is shown as an example. However, even when other neighboring blocks are enabled, indexes may be sequentially assigned according to a predetermined priority order, and the binary code values corresponding to each index may be determined according to the number of enabled candidates.

On the other hand, the size or the partition shape reconstructed in the video coding system may be various, and in this case, a plurality of neighboring blocks may belong to the same coding block (CB) or prediction block (PB) according to the positions of the neighboring blocks.

Figure 7:
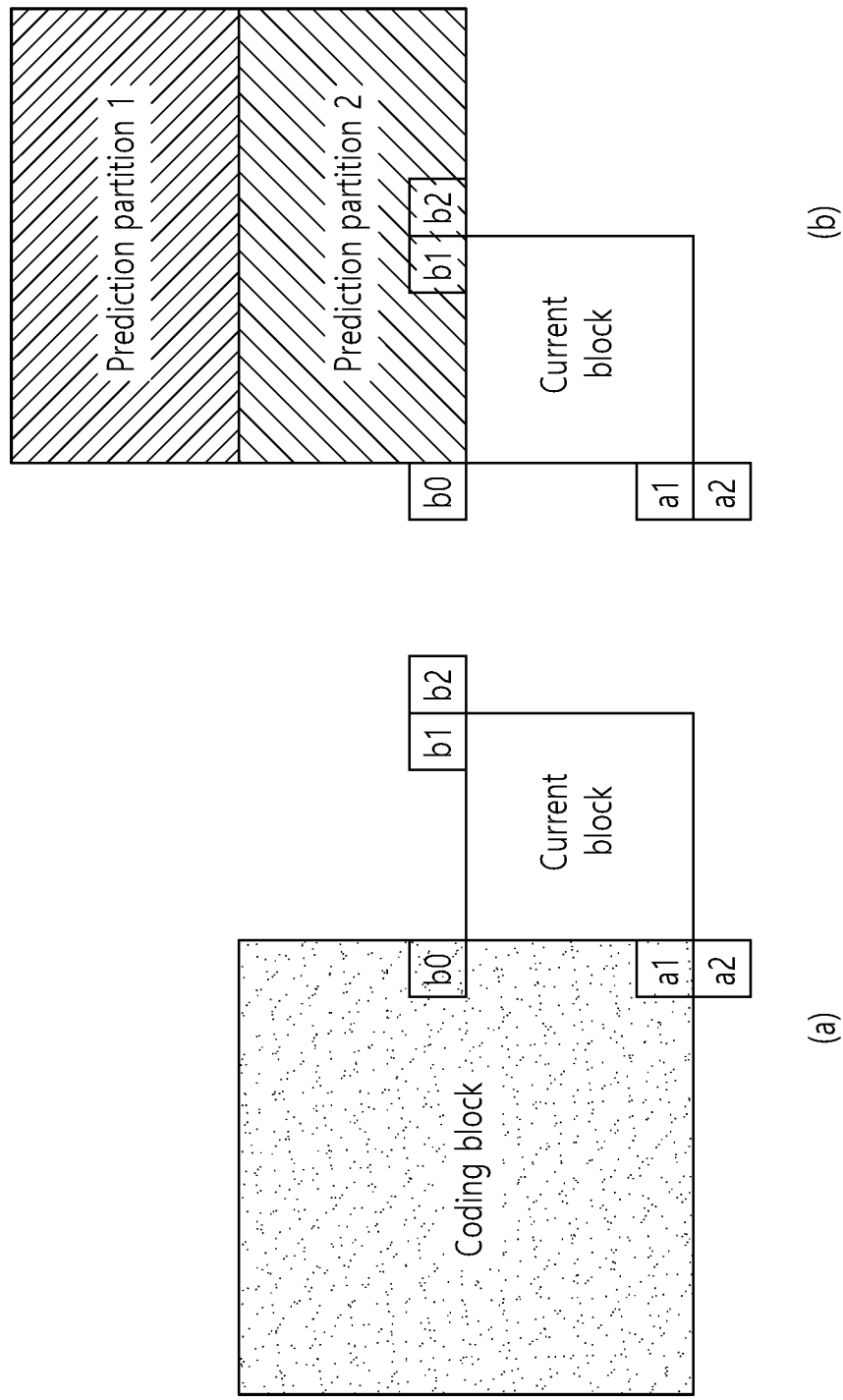
FIG. 7 is a view illustrating a case where a plurality of neighboring blocks belong to the same CB or the same PB.

FIG. 7 exemplarily shows a case where a plurality of neighboring blocks belong to the same CB or the same PB.

FIG. 7 exemplarily shows a case where a neighboring block is disabled.

Referring to FIG. 7, as described above, a lower left neighboring block of a current block may be a2, a left neighboring block may be a1, an upper right neighboring block may be b2, an upper neighboring block may be b1, and an upper left neighboring block may be b0. In this case, the left neighboring block a1 and the upper left neighboring block b0 may belong to the same coding block as shown in FIG. 7A. Also, as shown in FIG. 7B, the upper neighboring block b1 and the upper right neighboring block b2 may belong to the same prediction block (or prediction partition).

When a plurality of neighboring blocks belong to the same coding block or prediction block, the same filter coefficients may be generated for the plurality of neighboring blocks. In this case, similarly to the example of the disabled block, a portion of the plurality of neighboring blocks may be excluded from the candidate list. In this case, for example, more subordinate blocks may be excluded from the candidate list.

For example, if the order of the original candidate list is a1, b1, b2, a2, and b0, then the indexes and binary codes of the candidate lists for the case of FIGS. 7A and 7B may be derived as shown in Tables 4 and 5.

TABLE 4

| Index | Candidate | Binary |
|-------|-----------|--------|
| 0 | a1 | 0 |
| 1 | b1 | 10 |
| 2 | b2 | 110 |
| 3 | a2 | 111 |

TABLE 5

| Index | Candidate | Binary |
|-------|-----------|--------|
| 0 | a1 | 0 |
| 1 | b1 | 10 |
| 2 | a2 | 110 |
| 3 | b0 | 111 |

Table 4 shows binary codes for an embodiment (a), and Table 5 shows binary codes for an embodiment (b).

In Table 4 and Table 5, a case where a0 and b0 belong to the same coding block or b1 and b2 belong to the same prediction block is shown as an example. However, even when other random neighboring blocks belong to the same coding block or the same prediction block, a portion of the random neighboring blocks may be excluded from the candidate list. In this case, the binary code values corresponding to each index may be determined according to a predetermined priority order as described above.

On the other hand, when the generation of the filter coefficients is not performed in unit of coding block or prediction block but is performed based on a fixed size of block or a minimum unit block having the same motion information, regardless of whether the random neighboring blocks belong to the same coding block or the same prediction block, the random neighboring blocks may be considered as independent candidates and thus the filter coefficients may be generated. In this case, even though the random neighboring blocks belong to the same coding block or the same prediction block, the number of candidates in the candidate list, the index, and the binary code may not be changed.

Meanwhile, if the prediction mode of the current block is the skip mode or the merge mode and the partitioning mode is 2N×2N, then the merge candidate blocks may be the same as the candidate blocks shown in FIG. 4. When a specific merge candidate is selected in the skip mode or merge mode, it can be seen that the corresponding candidate block has the closest characteristic to the current block. Accordingly, the amount of data or the amount of bits necessary for separately encoding the filter coefficient index can be reduced by using the Wiener filter coefficients derived from the corresponding candidate block for the current block. In this case, the same candidate block as the candidate block indicated by the merge index may be used for deriving the Wiener filter coefficients.

Figure 8:
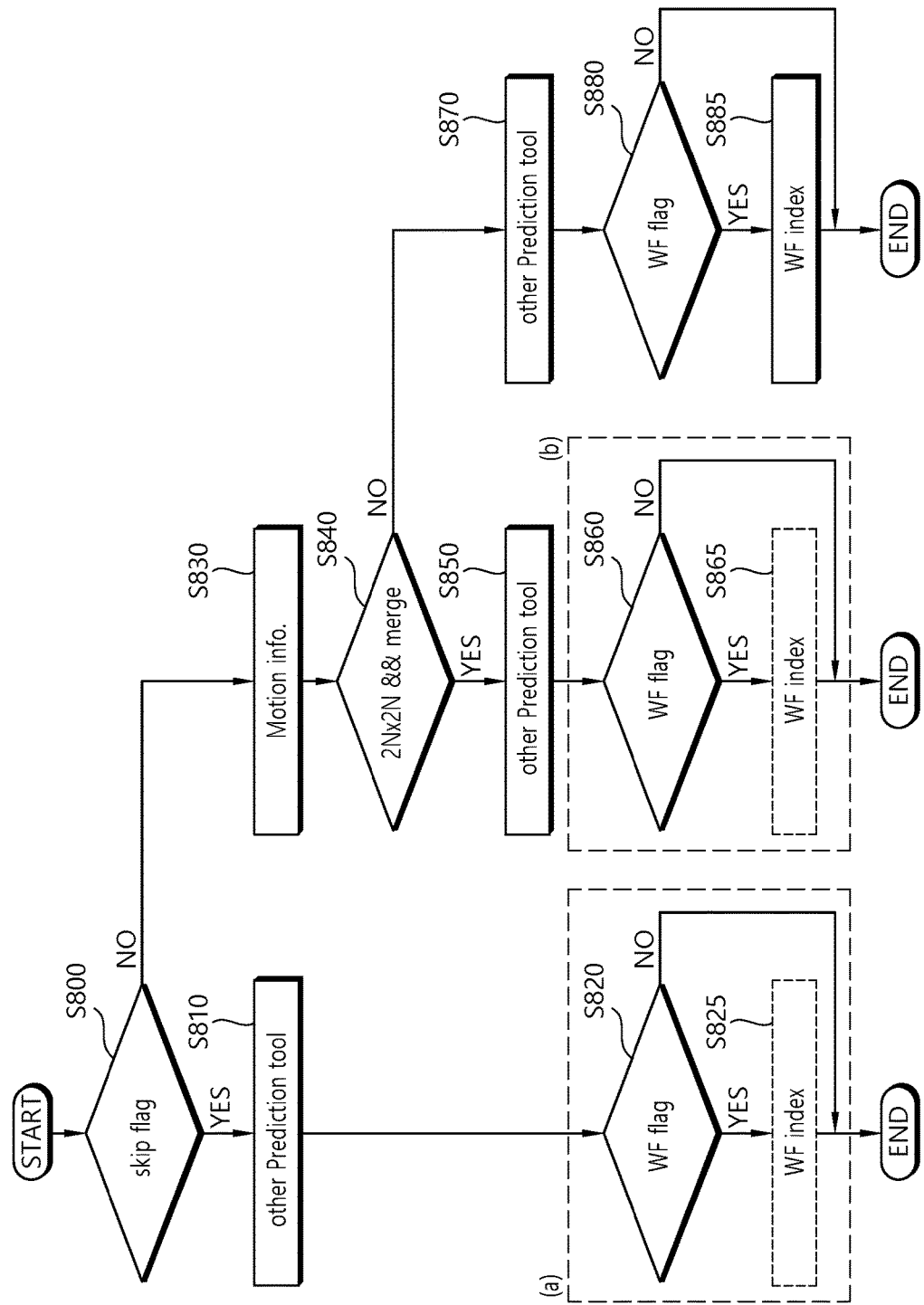
FIG. 8 is a view illustrating a method of deriving a filter index for deriving Winner filter coefficients from merge candidates.

In this case, the condition for deriving the filter index for deriving the Wiener filter coefficients from the merge index may be as follows.

a. When the prediction mode for the current block is the skip mode b. When the partitioning mode of the current block is 2N×2N and the prediction mode of the current block is the merge mode c. When both a/b are satisfied d. Selective combination of a to c FIG. 8 exemplarily shows a method of deriving a filter index for deriving Wiener filter coefficients from merge candidates. FIG. 8 shows an example in which a Wiener filter becomes enabled/disabled based on a prediction mode of a current block and a partitioning mode for the current block. Here, the current block may be a coding block or a prediction block.

Referring to FIG. 8, the decoding device receives a skip flag through a bitstream, and determines whether or not the value of the skip flag represents 1 (S700). A case where the value of the skip flag is 1 indicates that the prediction mode for the current block is a skip mode. The skip mode may mean that there is no residual signal regarding a difference between the original samples and the prediction samples for the current block. When the value of the skip flag is 0, the skip mode is not applied as the prediction mode for the current block.

When the value of the skip flag is 1 in operation S800, the decoding device performs a prediction procedure according to a skip mode-related prediction tool (S810). As an example, when the value of the skip flag is 1, the decoding device may derive the partitioning mode for the current block as 2N×2N without receiving the partitioning mode information on the current block. That is, in this case, the decoding device may derive a prediction block having the same size as the coding block, and may perform prediction based on the skip mode for the corresponding prediction block. Specifically, for example, the decoding device may receive a merge index, may perform inter-prediction using the MV of a block indicated by the merge index among the neighboring blocks of the prediction block as the MV of the current block, and may use the derived prediction samples as reconstructed samples.

The decoding device parses a WF flag and checks that the value of the WF flag indicates 1 (S820). A case where the value of the WF flag indicates 1 means that the Wiener filter is enabled or applied for the current block. A case where the value of the WF flag indicates 0 means that the Wiener filter for the current block is disabled.

When the value of the WF flag indicates 1 in operation S820, the decoding device may skip the parsing procedure of the WF index. That is, when the prediction mode of the current block is the skip mode, operation S825 may not be performed. In this case, the decoding device may derive the merge index to the WF index, or may derive the Wiener filter coefficients of the current block based on the candidate block derived based on the merge index. The decoding device applies filtering to the prediction samples in the current block based on the Wiener filter coefficients to reduce the difference between the prediction samples and the original samples as described above.

If the value of the skip flag is 0 in operation S800, the decoding device receives information on prediction (S830). Here, the information on prediction may include information on the partitioning mode and information on the prediction mode. The information on the partitioning mode indicates one of 2N×2N, N×2N, 2N×N, N×N, nL×2N, 2N×nU, nR×2N, and 2N×nD as the partitioning mode for the current block. The information on the prediction mode indicates an inter prediction mode for at least one prediction block in the current block. For example, the inter prediction mode may include a merge mode and an AMVP mode.

The decoding device checks whether the partitioning mode for the current block is 2N×2N and whether the prediction mode of the current block is the merge mode (S840).

If the partitioning mode for the current block is 2N×2N and the merge mode is applied in operation S840, the decoding device performs a prediction procedure according to a related prediction tool (S850). For example, the decoding device may derive a prediction block having the same size as the current block, and may perform inter-prediction on the prediction block. For example, the decoding device may perform merge index parsing, may derive the MV of the neighboring block to the MV of the prediction block based on the merge index, and may generate prediction samples based on the derived MV.

The decoding device parses a WF flag and checks that the value of the WF flag indicates 1 (S860). A case where the value of the WF flag indicates 1 means that the Wiener filter is enabled or applied for the current block. A case where the value of the WF flag indicates 0 means that the Wiener filter for the current block is disabled.

When the value of the WF flag indicates 1 in operation S860, the decoding device may skip the parsing procedure of the WF index. That is, when the prediction mode of the current block is the merge mode and the partitioning mode is 2N×2N, operation S865 may not be performed. In this case, the decoding device may derive the merge index to the WF index, or may derive the Wiener filter coefficients of the current block based on the candidate block derived based on the merge index. The decoding device applies filtering to the prediction samples in the current block based on the Wiener filter coefficients to reduce the difference between the prediction samples and the original samples as described above.

If the partitioning mode for the current block is not 2N×2N or the prediction mode of the current block is not the merge mode in operation S840, the decoding device derives at least one prediction block based on the corresponding partitioning mode, and performs the prediction procedure according to the related prediction tool (S870). For example, the decoding device may derive a plurality of prediction blocks according to the partitioning mode, and may perform inter prediction on each of the corresponding prediction blocks. For example, the decoding device may parse merge flags for each prediction block, may determine whether the merge mode or the Advanced Motion Vector Prediction (AMVP) mode is applied to each of the prediction blocks based on the parsing of the merging flags, and may perform inter prediction according to the determined mode.

The decoding device parses a WF flag and checks that the value of the WF flag indicates 1 (S860). A case where the value of the WF flag indicates 1 means that the Wiener filter is enabled or applied for the current block. A case where the value of the WF flag indicates 0 means that the Wiener filter for the current block is disabled.

When the value of the WF flag is 1 in operation S860, the decoding device parses (and decodes) the WF index, and derives Wiener filter coefficients of the current block based on the WF index and the neighboring blocks of the current block (S865). The decoding device may apply filtering to the prediction samples in the current block based on the Wiener filter coefficients to reduce the difference between the prediction samples and the original samples.

On the other hand, when the skip mode or merge mode is applied to the current block, even though the current block is predicted using a minimum of additional information (i.e., the prediction samples of the current block are generated), this is just a little better than encoding for a case where there are a large number of errors between the original block and the prediction block. When the amount of encoded data for application of the Wiener filter is large, the video compression efficiency may be reduced.

Accordingly, the application of the Wiener filter may be selectively disabled when the prediction mode of the current block is the skip mode or when the prediction mode of the current block is the merge mode and the partitioning mode is 2N×2N. In this case, it is possible to adaptively reduce the transmission of additional information and the operation complexity, thereby improving the compression performance and optimizing the coding efficiency according to the situation.

In the case where the prediction mode of the current block is a skip mode, if the Wiener filter application is disabled, then the procedures in the area (a) may not be performed in FIG. 8. That is, operations S820 and S825 may not be performed. In addition, in the case where the prediction mode of the current block is the merge mode and the partitioning mode is 2N×2N, when the Wiener filter application is disabled, the procedures in the area (b) may not be performed in FIG. 8. That is, operations S860 and S865 may not be performed.

Whether to derive the filter index based on the merge index and whether to disable application of the Wiener filter according to the inter prediction mode and/or the partitioning mode of the current block may be adaptively set through the following methods.

a. Signaling information indicating whether to apply in Sequence Parameter Set (SPS). In this case, selective application/non-application to the whole sequence is possible.

b. Signaling information indicating whether to apply in Picture Parameter Set (PPS). In this case, adaptive application/non-application for each picture is possible.

c. Signaling information indicating whether to apply in slice header. In this case, adaptive application/non-application for each slice is possible.

d. Application/non-application according to a predefined fixed method.

e. Selective combination of the methods of a to d

FIG. 9 schematically shows an example of a video encoding method according to an embodiment of the present invention. The method disclosed in FIG. 9 may be performed by the encoding device disclosed in FIG. 1. Specifically, for example, operations S900 to S940 of FIG. 9 may be performed by the predictor of the encoding device, and operation S950 may be performed by the entropy encoder of the encoding device.

Referring to FIG. 9, the encoding device generates prediction samples for a current block (S900). Here, the current block may be a coding block or a prediction block. According to the partitioning mode, one coding block may include one or more prediction blocks. The encoding device may derive an MV through motion estimation for each of the one or more prediction blocks, may find a reference block on a reference picture reconstructed based on the derived MV for each of the prediction blocks, and may derive a prediction sample of the corresponding prediction block based on the reconstructed sample in the reference block. The encoding device may collect the prediction samples generated in the prediction block unit to derive prediction samples for the coding block.

The encoding device determines whether or not a Wiener filter is applied to the current block (S910). The encoding device may compare Rate-Distortion (RD) costs between when the Wiener filter is applied and when the Wiener filter is not applied, and thus may determine whether or not the Wiener filter is applied. The encoding device may generate a Wiener filter flag based on the determination result. The encoding device may set the value of the Wiener filter flag to 1 when the Wiener filter is applied, and may set the value of the Wiener filter flag to 0 when the Wiener filter is not applied.

Also, the encoding device may determine that the Wiener filter is not applied when the prediction mode for the current block is a skip mode. Alternatively, the encoding device may determine that the Wiener filter is not applied when the prediction mode for the current block is a merge mode and the partitioning mode of the current block is 2N×2N. In this case, the encoding device may not signal the Wiener filter flag to the decoding device. This is because the decoding device can also implicitly determine that the Wiener flag is not applied according to the same determination criterion.

When the Wiener filter is applied, the encoding device generates a Wiener filter candidate list based on neighboring blocks of the current block (S920). In this case, the encoding device may generate the Wiener filter candidate list based on spatial neighboring blocks. The spatial neighboring blocks may include a lower left block, a left block, an upper right block, an upper block, and an upper left block of the current block. The encoding device may also generate the Wiener filter candidate list further based on the temporal corresponding block of the current block.

The Wiener filter candidate list may be configured based on a priority order preset for the neighboring blocks. For example, the Wiener filter candidate list may include the Wiener filter candidates as described in Table 1 above.

Also, the Wiener filter candidate list may be derived based on neighboring blocks enabled among the neighboring blocks. In this case, specific neighboring blocks that are disabled may not be included in the Wiener filter candidate list. For example, when a specific neighboring block among the neighboring blocks is located outside a current slice, when the specific neighboring block is located outside the boundary of a current picture, or when the specific neighboring block is intra-coded, it may be determined that the specific neighboring block is disabled.

In addition, when a plurality of specific neighboring blocks among the neighboring blocks belong to one coding block or belong to one prediction block, at least one of the plurality of specific neighboring blocks may not be included in the Wiener filter candidate list. In this case, only the most superordinate neighboring block among the plurality of specific neighboring blocks may be included in the Wiener filter candidate list, and other subordinate neighboring block(s) may be excluded from the Wiener filter candidate list. Alternatively, in this case, it may be determined that the other subordinate neighboring block(s) are disabled.

The encoding device derives Wiener filter coefficients for the current block based on the candidate blocks in the Wiener filter candidate list (S930). The encoding device may select at least one candidate block in the Wiener filter candidate list, and in this case, the Wiener filter coefficients may be derived based on the selected candidate block and the reference block of the candidate block. For example, the Wiener filter coefficients for the current block may be derived based on the Wiener filter coefficients for the selected candidate block. The Wiener filter coefficients for the selected candidate block may be derived based on reconstructed samples of the candidate block and reconstructed samples of the reference block of the candidate block.

The encoding device may generate a Wiener filter index indicating a Wiener filter candidate selected from the Wiener filter candidate list. In this case, the encoding device may differently set binary codes for the Wiener filter index according to the number of candidates of the Wiener filter candidate list and the value of the Wiener filter index. This is the same as described in Tables 2 to 5 above.

When the prediction mode for the current block is a skip mode, the value of the Wiener filter index may be set equal to the value of a merge index transmitted to indicate motion information of the current block. In this case, the same block as the neighboring block indicated by the merge index may be selected from the Wiener filter candidate list.

Alternatively, when the prediction mode for the current block is a merge mode and the partitioning mode of the current block is 2N×2N, the value of the Wiener filter index may be set equal to the value of the merge index transmitted to indicate the motion information of the current block. In this case, the same block as the neighboring block indicated by the merge index may be selected from the Wiener filter candidate list.

The encoding device filters the prediction samples for the current block based on the derived Wiener filter coefficients (S940). The encoding device may generate (modified) prediction samples that are more similar to the original sample through the filtering, thereby reducing the amount of data for residual samples.

The encoding device may derive residual samples based on the original samples and the filtered prediction samples. The encoding device may derive the residual samples through subtraction between the original samples in the original picture corresponding to the current block and the filtered prediction samples.

The encoding device encodes and outputs information on prediction (S950). The encoding device may further encode and output the residual information and the Wiener filter information according to circumstances as well as the information on prediction. The encoding device may entropy-encode the information on prediction, the residual information and/or the Wiener filter information, and may output the entropy-encoded information in a form of bitstream. When the prediction mode for the current block is the skip mode or when the prediction mode for the current block is a merge mode and the partitioning mode of the current block is 2N×2N, the Wiener filter flag and the Wiener filter index may not be encoded and outputted. The outputted bitstream may be transmitted or delivered to the decoding device through a network or a storage medium.

Here, the information on prediction may include prediction mode information and partitioning mode information for the current block. The residual information, which is information on the residual samples, may include transform coefficients in the frequency domain for the residual samples. The Wiener filter information, which is information related to the Wiener filter, may include the Wiener filter flag and the Wiener filter index.

FIG. 10 schematically shows an example of a video decoding method according to an embodiment of the present invention. The method disclosed in FIG. 10 may be performed by the decoding device disclosed in FIG. 2. Specifically, for example, operation S1000 of FIG. 10 may be performed by an entropy decoder of the decoding device, and operations S1010 to S1050 may be performed by a predictor of the decoding device.

Referring to FIG. 10, the decoding device obtains information on prediction from a bitstream received from the encoding device (S1000). The decoding device entropy-decodes the bitstream to obtain the information on prediction. The decoding device may further obtain residual information and Wiener filter information from the bitstream.

The information on prediction may include prediction mode information and partitioning mode information for a current block. The residual information, which is information on residual samples, may include transform coefficients in a frequency domain for the residual samples. The Wiener filter information, which is information related to the Wiener filter, may include a Wiener filter flag and a Wiener filter index. The residual information and the Wiener filter information may be omitted in some cases.

The decoding device generates prediction samples for the current block (S1010).

Here, the current block may be a coding block or a prediction block. According to the partitioning mode, one coding block may include one or more prediction blocks. The decoding device may derive an MV based on a merge index and an MVP index for each of the one or more prediction blocks, may find a reference block on a reference picture based on the derived MV for each of the prediction blocks, and may derive a prediction sample of the corresponding prediction block based on the reconstructed sample in the reference block. The decoding device may collect the prediction samples generated in the prediction block unit to derive prediction samples for the coding block.

The decoding device determines whether or not a Wiener filter is applied to the current block (S1020).

The decoding device may explicitly receive the Wiener filter flag through the bitstream, and may determine whether or not the Wiener filter is applied to the current block based on the Wiener filter flag.

Also, the decoding device may determine that the Wiener filter is not applied when the prediction mode for the current block is a skip mode. Alternatively, the decoding device may determine that the Wiener filter is not applied when the prediction mode for the current block is a merge mode and the partitioning mode of the current block is 2N×2N. In this case, the decoding device may not receive or parse the Wiener filter flag and the Wiener filter index from the bitstream. In this case, the decoding device may estimate or determine the value of the Wiener filter flag as 0.

When the Wiener filter is applied, the decoding device generates a Wiener filter candidate list based on neighboring blocks of the current block (S1030). In this case, the decoding device may generate the Wiener filter candidate list based on spatial neighboring blocks. The spatial neighboring blocks may include a lower left block, a left block, an upper right block, an upper block, and an upper left block of the current block. The decoding device may also generate the Wiener filter candidate list further based on the temporal corresponding block of the current block.

The Wiener filter candidate list may be configured based on a priority order preset for the neighboring blocks. For example, the Wiener filter candidate list may include the Wiener filter candidates as described in Table 1 above.

Also, the Wiener filter candidate list may be derived based on neighboring blocks enabled among the neighboring blocks. In this case, specific neighboring blocks that are disabled may not be included in the Wiener filter candidate list. For example, when a specific neighboring block among the neighboring blocks is located outside a current slice, when the specific neighboring block is located outside the boundary of a current picture, or when the specific neighboring block is intra-coded, it may be determined that the specific neighboring block is disabled.

In addition, when a plurality of specific neighboring blocks among the neighboring blocks belong to one coding block or belong to one prediction block, at least one of the plurality of specific neighboring blocks may not be included in the Wiener filter candidate list. In this case, only the most superordinate neighboring block among the plurality of specific neighboring blocks may be included in the Wiener filter candidate list, and other subordinate neighboring block (s) may be excluded from the Wiener filter candidate list. Alternatively, in this case, it may be determined that the other subordinate neighboring block(s) are disabled.

The decoding device derives Wiener filter coefficients for the current block based on the candidate blocks in the Wiener filter candidate list (S1040). The decoding device may select at least one candidate block in the Wiener filter candidate list, and in this case, the Wiener filter coefficients may be derived based on the selected candidate block and the reference block of the candidate block. For example, the Wiener filter coefficients for the current block may be derived based on the Wiener filter coefficients for the selected candidate block. The Wiener filter coefficients for the selected candidate block may be derived based on reconstructed samples of the candidate block and reconstructed samples of the reference block of the candidate block.

The decoding device may obtain a Wiener filter index from the bitstream, and may select the candidate block from the Wiener filter candidate list based on the Wiener filter index. The binary codes for the Wiener filter index may be differently set according to the number of candidates of the Wiener filter candidate list and the value of the Wiener filter index.

When the prediction mode for the current block is a skip mode, the value of the Wiener filter index may be set equal to the value of a merge index received to indicate motion information of the current block. In this case, the same block as the neighboring block indicated by the merge index may be selected from the Wiener filter candidate list.

Alternatively, when the prediction mode for the current block is a merge mode and the partitioning mode of the current block is 2N×2N, the value of the Wiener filter index may be set equal to the value of the merge index received to indicate the motion information of the current block. In this case, the same block as the neighboring block indicated by the merge index may be selected from the Wiener filter candidate list.

The decoding device filters the prediction samples for the current block based on the derived Wiener filter coefficients (S1050). The decoding device may generate (modified) prediction samples that are more similar to the original sample through the filtering, thereby reducing the amount of data for the residual samples.

The decoding device may generate a reconstructed picture based on the filtered prediction samples and/or residual samples. The decoding device may derive residual samples for the current block based on the obtained residual information, and may generate reconstructed samples by adding the residual samples and the filtered prediction samples for the current block. The decoding device may generate the reconstructed picture based on the reconstructed samples.

According to an embodiment of the present invention, it is possible to efficiently derive Wiener filter coefficients for a current block while using little additional information. In addition, according to an embodiment of the present invention, the prediction efficiency can be improved through filtering for prediction samples based on the Wiener filter coefficients, and the amount of data for residual signal transmission can be reduced, thereby improving the overall coding efficiency.

The above description is only illustrative of the technical idea of the present invention. Accordingly, those skilled in the art may make various modifications and variations to the above description without departing from the essential characteristics of the present invention. Accordingly, the embodiments disclosed herein are intended to be illustrative, not limiting, of the present invention. The scope of the present invention is not limited by these embodiments. The scope of protection of the present invention should be construed according to the following claims.

The above-described method according to an embodiment of the present invention can be implemented in a form of software, and the encoding device and/or decoding device according to an embodiment of the present invention can be included in a device that performs image processing such as a TV, a computer, a smart phone, a set-top box, and a display device.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage devices.

What is claimed is:
1. An image decoding method performed by a decoding device, the method comprising:
  obtaining information on a prediction from a bitstream;
  generating prediction samples by performing inter-prediction on a current block based on the information on the prediction;
  determining whether a Wiener filter is enabled for the current block;
  generating a Wiener filter candidate list based on neighboring blocks of the current block and deriving Wiener filter coefficients for the current block based on a candidate block in the Wiener filter candidate list when the Wiener filter is enabled; and
  filtering the prediction samples based on the derived Wiener filter coefficients,
  wherein the Wiener filter candidate list includes at least one neighboring block of a lower left block, a left block, an upper right block, an upper block, and an upper left block of the current block,
  wherein the candidate block is selected from at least one neighboring block included in the Wiener filter candidate list based on a Wiener filter index, and the Wiener filter index indicates the candidate block of the current block among candidate blocks in the Wiener filter candidate list,
  wherein the Wiener filter coefficients for the current block are derived based on Wiener filter coefficients for the selected candidate block, and
  wherein the Wiener filter coefficients for the selected candidate block are derived based on reconstructed samples of the candidate block and reconstructed samples of a reference block of the candidate block.

2. The method of claim 1, further comprising obtaining the Wiener filter index from the bitstream.

3. The method of claim 1, further comprising obtaining a Wiener filter flag from the bitstream,
wherein when a value of the Wiener filter flag is 1, it is determined that the Wiener filter is applied, and when the value of the Wiener filter flag is 0, it is determined that the Wiener filter is not applied.

4. The method of claim 1, wherein the Wiener filter candidate list is generated based on neighboring blocks enabled among the neighboring blocks of the current block, and
when a specific neighboring block among the neighboring blocks is located outside a current slice, when the specific neighboring block is located outside a boundary of a current picture, or when the specific neighboring block is intra-coded, it is determined that the specific neighboring block is disabled.

5. The method of claim 1, wherein the Wiener filter candidate list is configured according to a priority order of the neighboring blocks of the current block, and
when a plurality of specific neighboring blocks among the neighboring blocks belong to one coding block or belong to one prediction block, at least one of the plurality of specific neighboring blocks is not comprised in the Wiener filter candidate list.

6. The method of claim 1, wherein binary codes of the Wiener filter index are differently set according to the number of candidates of the Wiener filter candidate list and a value of the Wiener filter index.

7. The method of claim 1, wherein the information on the prediction comprises prediction mode information, merge index and partitioning mode information for the current block, and
a value of the Wiener filter index is set equal to a value of the merge index when the prediction mode for the current block is a skip mode.

8. The method of claim 1, wherein the information on the prediction comprises prediction mode information, merge index and partitioning mode information for the current block, and
a value of the Wiener filter index is set equal to a value of the merge index when the prediction mode for the current block is a merge mode and the partitioning mode of the current block is 2N×2N.

9. The method of claim 1, wherein the prediction-related information comprises prediction mode information and partitioning mode information for the current block, and
when the prediction mode for the current block is a skip mode, the Wiener filter is not applied, or when the prediction mode for the current block is a merge mode and the partitioning mode for the current block is 2N×2N, it is determined that the Wiener filter is not applied.

10. The method of claim 9, wherein when the prediction mode for the current block is the skip mode, or when the prediction mode for the current block is the merge mode and the partitioning mode of the current block is the 2N×2N, a Wiener filter flag and a Wiener filter index are not obtained from the bitstream, and a value of the Wiener filter flag is estimated to be 0.

11. The method of claim 1, wherein the reference block of the candidate block is a block indicated by a motion vector of the candidate block on a reference picture of the candidate block.

12. The method of claim 1, wherein the Wiener filter is calculated based on the following equation:

$$\Sigma R^T R \cdot h = \Sigma R^T O$$

wherein R is a matrix formed of samples of a reference block, h is a Wiener filter coefficient matrix, O is a sample of a neighboring block, and RT denotes a transpose matrix of the matrix R.

13. An image encoding method performed by an encoding device, the method comprising:
generating prediction samples for a current block based on inter prediction;
determining whether a Wiener filter is enabled for the current block;
generating a Wiener filter candidate list based on spatial neighboring blocks of the current block when the Wiener filter is enabled and deriving Wiener filter coefficients for the current block based on a candidate block in the Wiener filter candidate list;
filtering the prediction samples based on the derived Wiener filter coefficients; and
encoding and outputting prediction-related information for the current block,
wherein the Wiener filter candidate list includes at least one neighboring block of a lower left block, a left block, an upper right block an upper block and an upper left block of the current block,
wherein the candidate block is selected from at least one neighboring block included in the Wiener filter candidate list,
wherein the Wiener filter coefficients for the current block are derived based on Wiener filter coefficients for the selected candidate block, and
wherein the Wiener filter coefficients for the selected candidate block are derived based on reconstructed samples of the candidate block and reconstructed samples of a reference block of the candidate block.

14. The method of claim 13, further comprising generating a Wiener filter index,
wherein the Wiener filter index indicates the candidate block of the current block among candidate blocks in the Wiener filter candidate list.

15. The method of claim 14, wherein the prediction-related information comprises prediction mode information, merge index and partitioning mode information for the current block, and
when the prediction mode for the current block is the skip mode, or when the prediction mode for the current block is the merge mode and the partitioning mode of the current block is the 2N×2N, a value of the Wiener filter index is set equal to a value of the merge index.

16. The method of claim 13, wherein the Wiener filter candidate list is generated based on neighboring blocks enabled among the neighboring blocks of the current block, and
when a specific neighboring block among the neighboring blocks is located outside a current slice, when the specific neighboring block is located outside a boundary of a current picture, or when the specific neighboring block is intra-coded, it is determined that the specific neighboring block is disabled.

17. The method of claim 13, wherein the Wiener filter candidate list is configured according to a priority order of the neighboring blocks of the current block, and
when a plurality of specific neighboring blocks among the neighboring blocks belong to one coding block or belong to one prediction block, at least one of the plurality of specific neighboring blocks is not comprised in the Wiener filter candidate list.

18. The method of claim 13, wherein the prediction-related information comprises prediction mode information and partitioning mode information for the current block, and
when the prediction mode for the current block is a skip mode, the Wiener filter is not applied, or when the prediction mode for the current block is a merge mode and the partitioning mode for the current block is 2N×2N, it is determined that the Wiener filter is not applied.

19. The method of claim 13, wherein the reference block of the candidate block is a block indicated by a motion vector of the candidate block on a reference picture of the candidate block.

20. The method of claim 13, wherein the Wiener filter is calculated based on the following equation:

$$\Sigma R^T R \cdot h = \Sigma R^T O$$

wherein R is a matrix formed of samples of a reference block, h is a Wiener filter coefficient matrix, O is a sample of a neighboring block, and RT denotes a transpose matrix of the matrix R.

* * * * *